United States Patent [19]

Nelson

[11] 4,127,375
[45] Nov. 28, 1978

[54] DISPENSING DEVICE

[76] Inventor: Jacob T. Nelson, 105 W. Lee Rd., Taylors, S.C. 29682

[21] Appl. No.: 751,582

[22] Filed: Dec. 17, 1976

[51] Int. Cl.² ............................................. A21C 11/10
[52] U.S. Cl. ...................................... 425/313; 17/32; 222/391; 425/311
[58] Field of Search ............... 425/309, 310, 311, 313, 425/376, 308; 17/32; 222/390, 80, 391

[56] References Cited

U.S. PATENT DOCUMENTS

| 560,885 | 5/1896 | Arnold | 425/311 |
| 949,545 | 2/1910 | Muller | 222/391 X |
| 1,215,362 | 2/1917 | Ganzhorn | 222/80 |
| 1,233,510 | 7/1917 | Rognlie | 222/390 X |
| 1,946,740 | 2/1934 | Hall | 425/311 |
| 2,150,659 | 3/1939 | Santo | 17/32 |
| 2,234,432 | 3/1941 | Gallo | 425/311 |
| 2,604,858 | 7/1952 | Bosa | 222/391 X |

FOREIGN PATENT DOCUMENTS

| 32,443 | 10/1923 | Denmark | 17/32 |
| 850,458 | 12/1939 | France | 222/391 |
| 2,238,316 | 2/1975 | France | 425/376 |
| 46,463 | 3/1918 | Sweden | 17/32 |

Primary Examiner—J. Howard Flint, Jr.
Assistant Examiner—William R. Briggs
Attorney, Agent, or Firm—Bailey, Dority & Flint

[57] ABSTRACT

A dispensing device for rapidly dispensing a plurality of uniform dough masses is illustrated wherein an axially movable lid member is provided for aiding the flow of dough from the interior of a dough chamber through a dispensing outlet carried adjacent a bottom end of the chamber and a separator member is provided for synchronized movement with the lid member to sever a predetermined amount of dough as it flows from the dispensing outlet forming a separated dough mass of uniform amount and shape.

4 Claims, 3 Drawing Figures

DISPENSING DEVICE

BACKGROUND OF THE INVENTION

Hushpuppies and the like made from various recipes of dough mixtures have been enjoyed for a long time, particularly when eaten with fish and seafoods. Normally, the hushpuppy is shaped by spooning out a mass of dough and then scraping the dough from the spoon into a hot container of grease. However, with the advent of fast food restaurants for serving fish and seafood, the prior methods of shaping and cooking hushpuppies are not adequate for preparing large quantities of hushpuppies quickly. While it is desirable to prepare and cook the hushpuppy mixture quickly, it is also desirable that the hushpuppies be of uniform amount and shape so that they cook uniformly. When spooning out the hushpuppy mixture, different amounts and shapes of dough mixture are dispensed resulting in some hushpuppies being cooked more than others.

Accordingly, it is an important object of the present invention to provide a dispensing apparatus for rapidly dispensing a plurality of uniform dough masses having a predetermined shape and amount of dough contained therein.

Another important object of the present invention is to provide a dispensing device for rapidly dispensing a plurality of uniform dough masses wherein the device is of such a size that it can be easily held during manual operation and may be easily stored when not in use.

Another important object of the present invention is to provide a dough dispensing device wherein the movement of dough through the container and the severing of the dough as it passes through an outlet is synchronized so that a predetermined amount of dough is dispensed from the device automatically.

Still, another important object of the present invention is the provision of a lid member carried coextensively with the interior of a dough chamber which is axially movable therein for aiding the flow of dough through the container wherein the lid member may be easily removed for refilling the dough container with dough.

SUMMARY OF THE INVENTION

It has been found that by utilizing an axially movable lid member carried coextensively within the interior of a dough chamber and a separator member actuated in synchronism with the movement of the lid member, that a predetermined amount of dough may be dispensed from the dough chamber as it flows outwardly from a dispensing outlet. The lid member is threadably connected to a shaft carried centrally in the dough chamber and is connected by a releasable member so that it may be removed quickly from the chamber for refilling the chamber with dough.

BRIEF DESCRIPTION OF THE DRAWINGS

The construction designed to carry out the invention will be hereinafter described, together with other features thereof.

The invention will be more readily understood from a reading of the following specification and by reference to the accompanying drawing forming a part thereof, wherein an example of the invention is shown and wherein.

DESCRIPTION OF A PREFERRED EMBODIMENT

Figure 3:
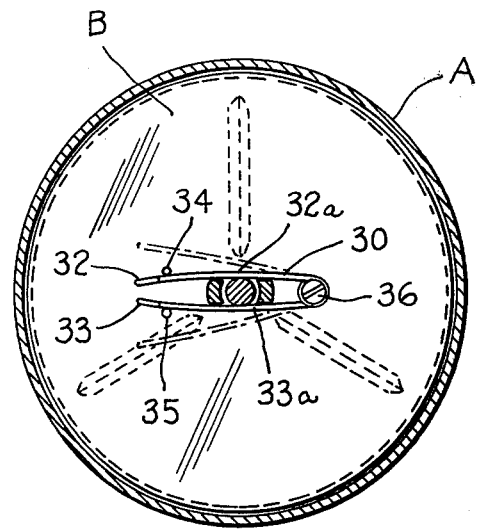
FIG. 3 is a sectional view taken along line 3—3 of FIG. 1 illustrating the releasable connection between the movable lid member and the threadable drive shaft of the present invention.

The drawing illustrates a dough dispensing device for rapidly dispensing a plurality of uniform dough masses including a dough chamber A having an inlet ajdacent one end for receiving dough to fill the chamber and a dough dispensing outlet carried adjacent the opposing end thereof. Lid means is provided by a lid member B carried coextensive with the interior of the dough chamber and axially movable therein toward the dispensing outlet for aiding the flow of dough through the chamber and the dispensing outlet. Separator means is provided by a cutting blade C carried adjacent the dispensing outlet for transverse motion relative to the dough as it passes from the outlet for severing the dough to form a separated dough mass. A drive means D for synchronizing the movement of the lid means and the separator means is connected therebetween so that a desired amount of dough flows outwardly through the dispensing outlet immediately preceding passage of the separator means across said outlet to sever and dispense a predetermined amount of dough.

Figure 1:
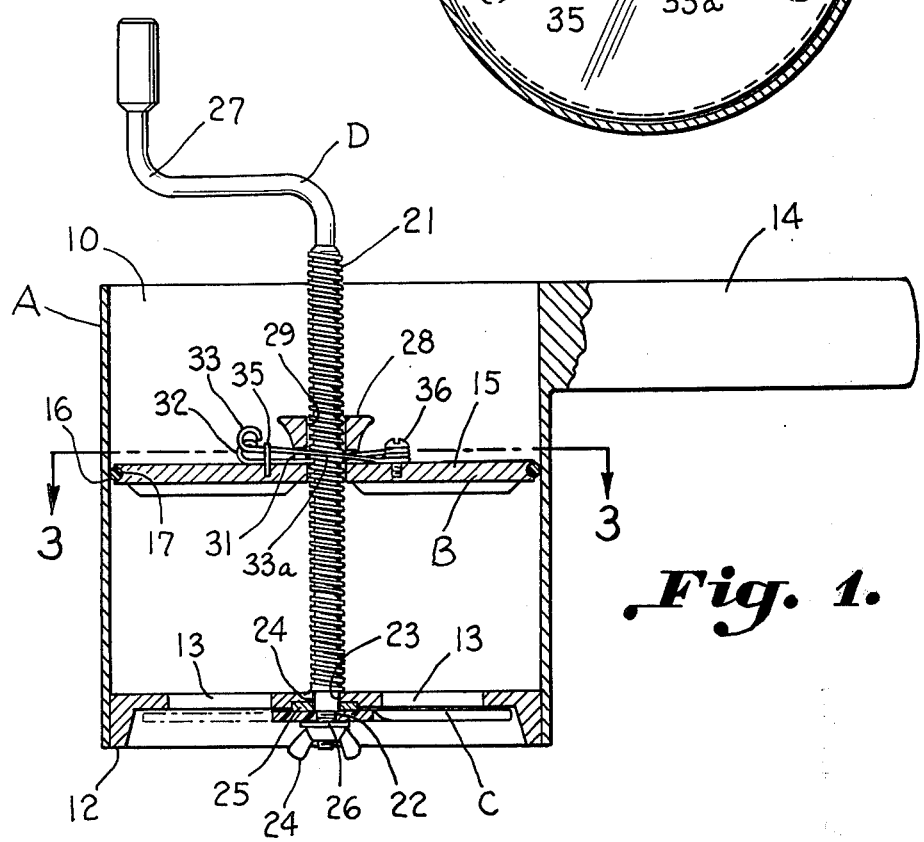
FIG. 1 is a partially, cut-away side elevation illustrating a dough dispensing device constructed in accordance with the present invention.
Figure 2:
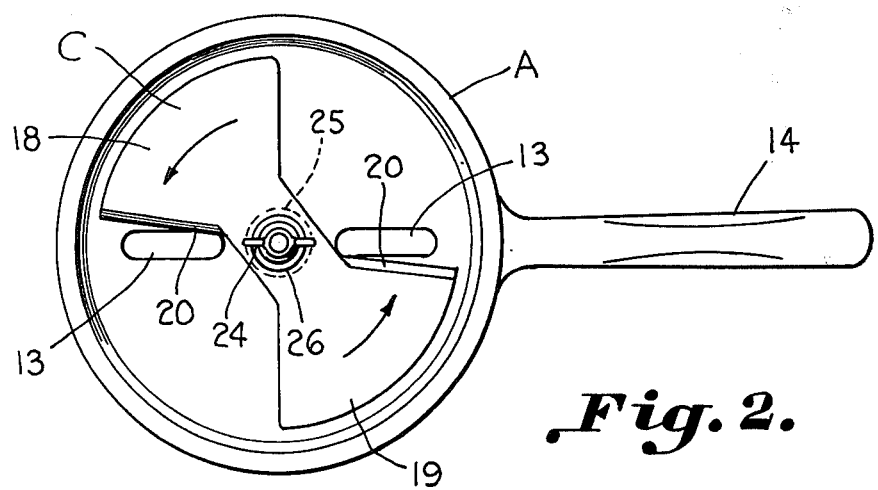
FIG. 2 is a bottom plan view of the device in FIG. 1 illustrating the separator member for severing dough from the chamber.

Referring now in more detail to FIG. 1, the dough chamber A is illustrated as including an open top end 10 which provides an inlet for filling the interior of the chamber with dough. The opposing end of the dough chamber provides a dispensing outlet in the form of a plate 12 having a plurality of outlet openings 13 formed therein and through which dough flows under the axial movement of the lid means B. The outlet plate 12 may be made as one piece with the dough chamber or may be made integral therewith such as by welding. The dough chamber A has a handle portion 14 by which the chamber may be held when in operation.

The lid means B includes a plate member 15 which is carried coextensive with the cross-sectional area of the dough chamber interior. A resilient O-ring 16 is carried within a notch 17 formed in the periphery of the plate member 15 to insure a tight fit and seal against the interior walls of the dough chamber. This insures that the dough flows more completely from the chamber through the dispensing outlet leaving little or no waste.

In the illustrated embodiment, the cutter blade C includes a pair of fan-shaped blades 18 whose forward-most edges are beveled at 20 for severing and separating the dough as it flows through the outlet openings 13. The blade C is carried adjacent the exterior surface of the outlet plate 12 for substantially flush rotation across the plate and outlet openings so that the dough is severed in a shearing type action.

The drive means D includes a rotatable threaded shaft 21 centrally carried in the dough chamber A having a reduced threaded end portion at 22 and an intermediate portion 23 extending through an opening 24 formed in the outlet plate 12. Received over the threaded end 22 is the cutting blade C. The assembly is secured together by means of a wing nut 24 which tightens the blade C between washers 25 and 26 so that the blade C rotates with the threaded shaft 21 as the shaft is rotated manually by a handle portion 27. By connecting the lid member 15 to the threaded shaft 21 so that it travels down the threads of the shaft, it is possible to synchronize the downward axial movement of the lid means B with the rotation of the separator blade C.

As illustrated, the lid member 15 includes a central hub 28 having a bore 29 extending through the hub and the lid member 15 for receiving the threaded shaft 21. The lid member further includes a connector means 30 which connects and threadably mates the lid with the threaded shaft 21. In this embodiment, the connector means 30 includes a resilient wire spring which has access to the threads of the shaft 21 through transverse slots 31 formed in the central hub 28. The releasable wire member 30 is in the form of a spring wherein the free ends 32 and 33 are normally biased outwardly in the position shown by the dotted lines. The free ends must be deformed inwardly and received behind a pair of posts 34 and 35 carried on the lid for locking the elongated portions 32a and 33a of the wire spring into engagement with the threads of the shaft 21. A screw member 36 secures the eye portion of the releasable spring member to the lid member 15.

It will be observed that as the handle member 27 is rotated in a clockwise direction, the lid member 15 will travel down the threads in an axial direction toward the outlet openings 13 aiding the flow of dough through the chamber A and the dispensing outlets. At the same time and in a synchronous manner, the cutter blade C will be rotated in a counter-clockwise direction so that the beveled edge 20 thereof will rotate across the outlet opening 13 to sever a desired amount of dough. The synchronized timing between the movement of lid member B and cutter blade C provides that a predetermined amount of dough passes through the outlet opening immediately preceding passage of the beveled edge 20 whereby the amount is severed and dispensed into an associated cooking appliance.

By synchronizing the movement of the lid B and the cutter blade C, the same amount of dough may be severed and dispensed from each opening as the handle is rotated providing dough masses of uniform amount and shape. Once all of the dough is dispensed from within the dough chamber B, the releasable wire means 30 is released from the thread mating relationship with the shaft 21 so that the lid may be quickly lifted up over the threaded shaft 21 for filling the container once again. Therefore, in this embodiment the operator is saved from having to rotate the handle in the opposite or counterclockwise direction in order to raise the lid 15 through the open top 10 of the dough container for refilling. This expedient is particularly useful when using the dispensing device in franchise operations where dough masses must be dispensed quickly and in large numbers.

While a preferred embodiment of the invention has been described using specific terms, such description is for illustrative purposes only, and it is to be understood that changes and variations may be made without departing from the spirit or scope of the following claims.

I claim:

1. A dough dispensing device for rapidly dispensing a plurality of uniform dough masses comprising:

a dough containing chamber having an inlet adjacent one end for receiving dough to fill said chamber and a dough dispensing outlet carried adjacent the opposing end thereof;

lid means carried coextensive with the interior of said dough chamber and axially movable therein toward said dispensing outlet for aiding the flow of dough therethrough;

separator means movable transversely relative to said dispensing outlet including a rotatable blade for severing dough passing therethrough to form a separated dough mass;

drive means providing synchronized axial movement of said lid means and rotational movement of said blade so that a predetermined amount of dough is severed and dispensed;

said drive means includes a rotatable threaded shaft carried centrally in said dough chamber;

releasable connector means carried by said lid means threadably mating with the threads of said shaft causing said lid means to travel the length of said shaft when rotated; and said releasable connector means including a central hub portion carried on said lid means having an axial bore formed therein for receiving said threaded shaft, slot means formed within said hub providing access to the threads of said shaft, and releasable wire means carried on said lid means receivable in said slot means in engagement with said threads providing said thread mating relationship.

2. The apparatus of claim 1 wherein said dispensing outlet includes a plate carried by said dough chamber having at least one outlet opening formed therein, said blade being carried for substantially flush rotation across said outlet opening to shear said dough therefrom.

3. The apparatus of claim 1 further comprising handle means connected to said threaded shaft for manually rotating said shaft and said blade.

4. The apparatus of claim 1 wherein said dough chamber is cylindrical and inclues a handle portion for manually supporting said dough dispensing device.

* * * * *